United States Patent Office 3,384,916
Patented May 28, 1968

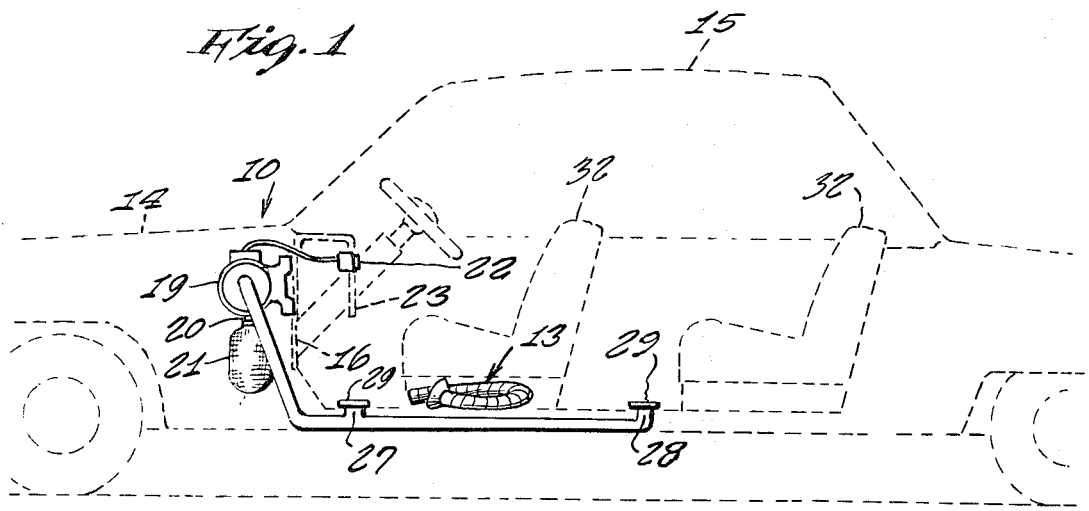
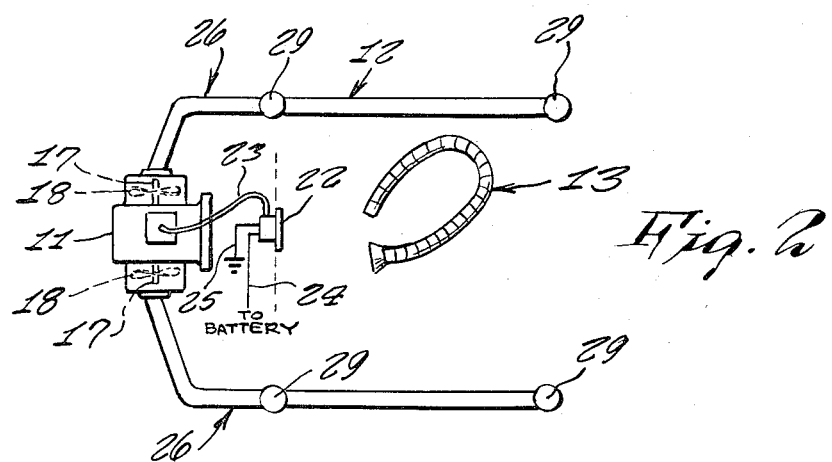
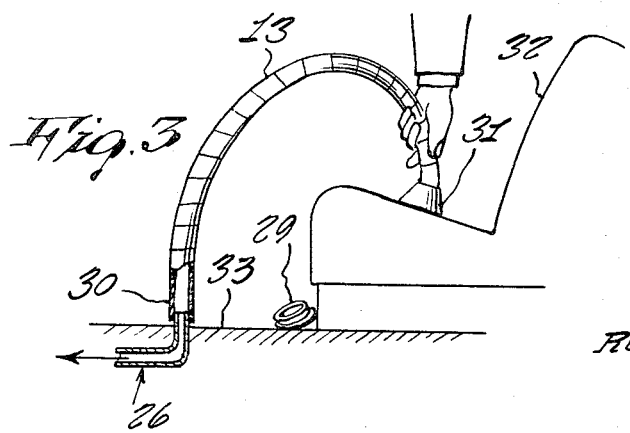

3,384,916
AUTOMOBILE VACUUM CLEANING SYSTEM
Russell Hockin, Montgomery Road,
Fort Montgomery, N.Y. 10922
Filed May 25, 1966, Ser. No. 552,827
1 Claim. (Cl. 15—313)

ABSTRACT OF THE DISCLOSURE

A self-contained vacuum cleaning system within an automobile, including motor driven fan means connected to ducts under the floor of the automobile, the ducts having a series of upward extending outlets enclosed by removable covers, the outlets being selectively connectable to a hose having a dust receiving head at one end, the motor driven fan being selectively operated from the dashboard for transporting dirt through the ducts toward a disposal bag.

---

This invention relates generally to automotive equipment. More specifically it relates to automobile vacuum cleaners.

A principal object of the present invention is to provide a vacuum cleaner system for an automobile which is self-contained within the automotive vehicle and which eliminates the necessity of bringing extra equipment to the automobile for purpose of vacuuming the upholstery and carpeting within the automobile.

Another object of the present invention is to provide an automobile vacuum cleaning system which can be readily installed into existing automotive vehicles or which may be incorporated into the construction of new automobiles now being manufactured.

Yet another object of the present invention is to provide an automobile vacuum cleaning system which can be conveniently supported upon the wall of a conventional automotive vehicle and which incorporates simple ducts which lead into the passenger compartment where a simple vacuum hose may be selectively secured at any of several openings for purpose of vacuuming the upholstery and carpeting in that vicinity.

Other objects of the present invention are to provide an automobile vacuum cleaning system which is simple in design, inexpensive to manufacture, rugged in construction, easy to use and efficient in operation.

These and other objects will be readily evident on a study of the following specification and the accompanying drawing wherein FIGURE 1 is a side elevation view of the present invention shown incorporated in a passenger automobile, FIGURE 2 is a planned view thereof, and FIGURE 3 is an enlarged detailed side elevation view showing the device in operative use.

Referring now to the drawing in detail the numeral 10 represents an automobile vacuum cleaning system which includes a motor 11, a duct system 12 and an attachable hose 13.

The motor 11 is mounted under the hood 14 of the automobile 15 and is supported upon the wall 16 as shown in FIGURE 1 of the drawing. The motor is provided with a shaft 17 extending out of each end of the motor, as shown in FIGURE 2, and a fan 18 is mounted upon each end of the motor shaft. The motor mechanism is securely insulated within a case not shown, for purpose of preventing dust from entering the motor mechanism. On the underside of the motor housing 19 there is an outlet 20 to which there is removably secured a dust bag 21 which may be of disposable type if preferred.

A motor switch 22 is conveniently mounted upon the dashboard 23 of the automobile where the motorist may conveniently turn the switch on or off as necessary. The switch is connected by means of cable 23 to the motor 11 which is thus brought into a circuit between a battery wire 24 and a ground wire 25, thereby providing power from the automobile battery to the motor 11.

Adjacent each fan 18 there is a duct unit 26 which comprises a tubing leading from the fan downwardly under the body of the car and adjacent their chassis. Each of the ducts extends rearwardly under the car body, and each duct is provided with a pair of outlets 27 and 28. As is shown in FIGURE 1 of the drawing, the outlet 27 is located in the vicinity of the front seat of the automobile so to provide a means for cleaning that particular area whereas the outlet 28 is in the vicinity of the rear seat of the automobile. Each outlet extends upwardly into the passenger compartment of the automobile and each outlet is provided with a cap 29 which may be removed so to permit the end 30 of the hose 13 to be connected thereto. The opposite end of the hose 13 comprises a head 31 which is designed for brushing or picking up lint, dust and other dirt from the seats 32 or the carpeting 33 within the automobile.

In operative use the motorist simply turns on the switch 22 to provide electrical power to the motor 11. He then removes one of the caps 29 from the outlets 27 or 28 and with the hose 13 in his hand he draws the head 31 thereof across any surface which he desires to be cleaned of dust or the like.

Thus it has been shown a convenient, self-contained mechanism for being incorporated into an automobile for the purpose of vacuum cleaning the interior thereof.

While various changes may be made in the detailed construction, it is understood that such changes will be within the spirit and scope of the present invention as it is defined by the appended claim.

I claim:

1. In an automobile vacuum cleaning system, the combination of a motor, switch means for said motor to provide power from an automobile battery to said motor, said motor being contained within a motor housing, said motor housing having an outlet, a dust bag removably secured to said outlet, and duct means connected to said motor housing for collecting dirt and dust from the interior of said automobile and delivering said dirt and dust to said dust bag, said motor comprising a motor shaft extending out of each side of said motor, the ends of said motor shaft being contained within said motor housing, a fan secured upon each said end of said motor shaft within said housing and each of said fans being adjacent one end of a duct comprising said duct means, said switch means comprising a switch mounted upon the dashboard of said automobile, said switch being connected to said motor to place said motor within a circuit between said battery and a ground terminal, each of said ducts comprising a tubular member, one end of said tubular member being adjacent to said fan within said housing, said ducts extending horizontally under the automobile floor in a longitudinal direction along each side of said automobile, said ducts being parallel to each other, a pair of upward extending outlets within each of said ducts, one of said outlets being in the vicinity of the front seat of said automobile and the other of said outlets being in the vicinity of the rear seat of said automobile, each of said outlets being flush with said automobile floor, each of said outlets being enclosed by a removable cap, and a removable hose being secured at its one end selectively to one of said duct outlets, the other end of said hose having a head for receiving dust therein for transporting said dust to said dust bag secured to said outlet on said motor housing.

References Cited

UNITED STATES PATENTS

| | | |
|---|---|---|
| 862,053 | 7/1907 | Cobb. |
| 1,729,364 | 9/1929 | Schwier et al. |
| 2,218,265 | 10/1940 | Norwood _____ 15—313 XR |
| 2,299,668 | 10/1942 | Webster. |
| 3,230,567 | 1/1966 | Nickless _____ 15—313 |

ROBERT W. MICHELL, *Primary Examiner.*